June 6, 1944.

I. MORIOKA 2,350,796

PROCESS FOR PLASTICALLY REPRODUCING OBJECTS

Filed Nov. 20, 1940

Inventor.
Isao Morioka.
By Attorneys.

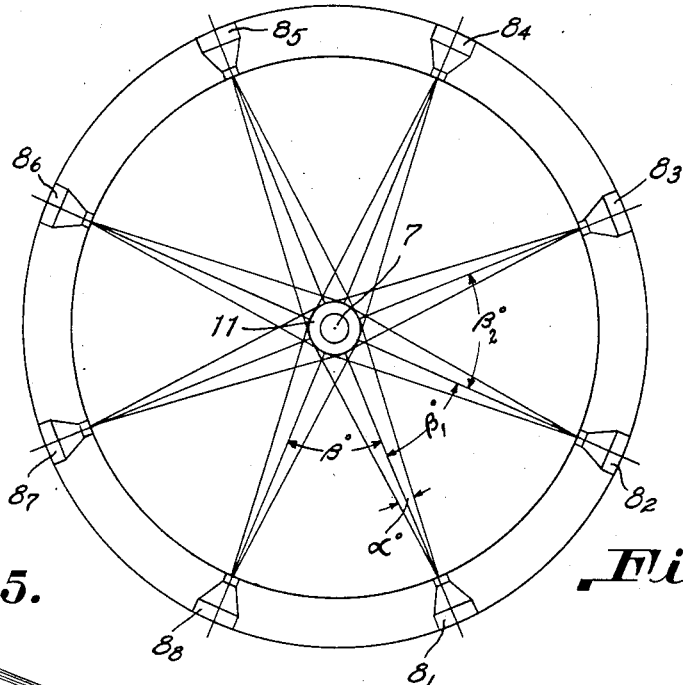
Fig. 4.
Fig. 5.
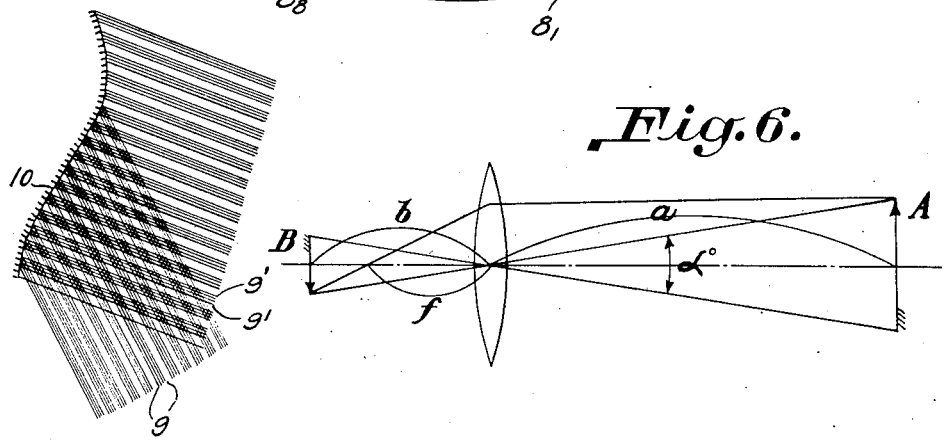
Fig. 6.
Fig. 7.
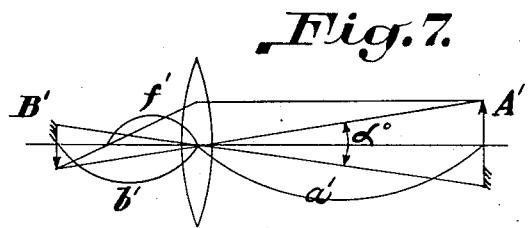
Inventor.
Isao Morioka.
By Attorneys.

Patented June 6, 1944

2,350,796

UNITED STATES PATENT OFFICE 2,350,796

PROCESS FOR PLASTICALLY REPRODUCING OBJECTS

Isao Morioka, Tokyo, Japan; vested in the Alien Property Custodian

Application November 20, 1940, Serial No. 366,503
In Japan March 26, 1940

2 Claims. (Cl. 41—25)

The present invention relates to a process for plastically reproducing objects.

The invention has for its object to sculpture busts or statues which are similar to objects to be reproduced.

The process of the invention consists of four steps to be carried out in succession.

The apparatus necessary for the first and second steps consists of a set of more than three cameras and more than two projectors installed around a vertical photographing axis in the form of a line on which an upper and a lower target is provided.

In this case, each of said projectors is arranged so as to be capable of projecting the image of a screen provided with many stripes or points thereon.

In the first step, only the photographing axis of said slender line is photographed by means of the above mentioned cameras which are operated simultaneously. The dry plates thus exposed are left undeveloped.

In the second step, an object to be reproduced, for instance, a human body, is caused to sit or stand in the initial position of said photographing axis and a duplicate photographing of the object has to be carried out on the same dry plates undeveloped as those employed in the first step by the simultaneous actuation of the cameras while projecting the images of screens used with the projectors onto the object during the second exposure of the photographic plates.

In the third step, the negative photographs treated in the first and second steps have to be enlarged or contracted in the required proportions and printed, so that positive pictures can be obtained.

In the fourth step, a vertical sculpturing axis has to be provided corresponding to the vertical photographing axis which was employed in the first and second steps.

Then magic lanterns equal in number to that of the cameras initially employed are installed around said vertical sculpturing axis as a central line in substantially similar positions as that occupied by the cameras initially employed during the photographing in the first and second steps around the vertical photographing axis.

That is to say, each magic lantern, in this case, is so arranged as to take the same projecting angle as that of each corresponding camera, so that the respective positive picture obtained in the third step can be projected on some plastic material, for instance, modelling clay. This material has to be heaped, or, as the case may require, built up to the intersecting lines or points of the projected lines of more than two photographs denoting the definite lines or points on the object in accordance with the stripes or points of the screens that were projected on the object in the second step, thereby enabling a bust or statue to be sculptured which is similar to the object to be reproduced.

For a better understanding of the invention, reference is made to the accompanying drawings.

Fig. 4 is a diagrammatic plan view illustrating the arrangement of magic lanterns for the purpose of projecting the positive picture in the third step.

Fig. 5 is a partial view indicating the fourth step.

Fig. 6 and Fig. 7 are diagrammatic views illustrating the enlarging or contracting proportions of a taken picture and also indicating the process for determining the distance between the magic lanterns and the plastic material to be sculptured.

Figure 1:
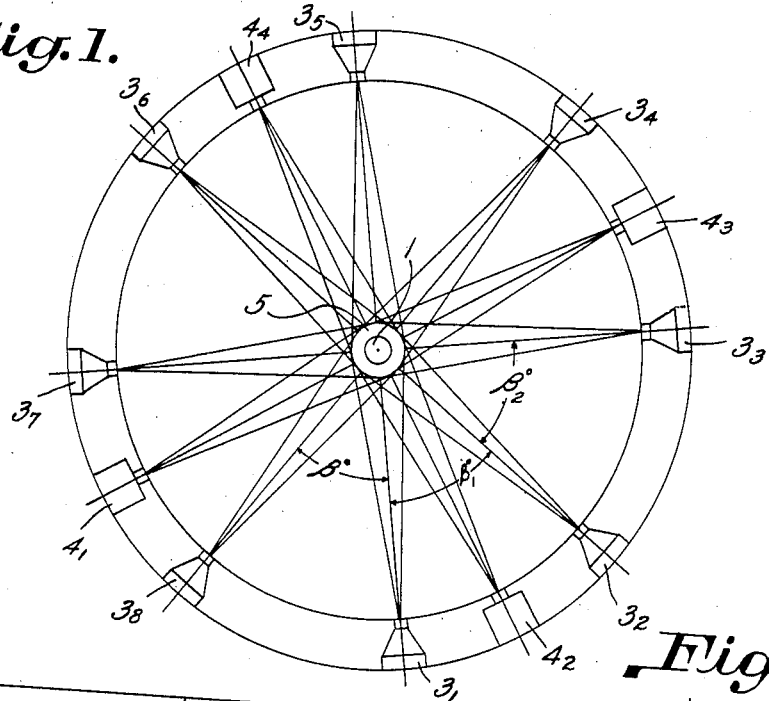
Fig. 1 is a diagrammatic plan view illustrating the photographing process which has to be carried out in the first and second steps of the present invention.
Figure 2:
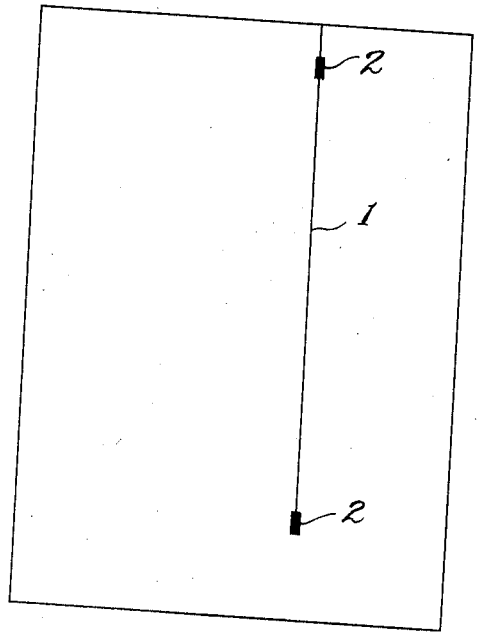
Fig. 2 is a view of a negative obtained in the first step.

Two points, 2, as shown in Fig. 2 are indicated respectively at an upper and a lower position on the vertical photographing axis 1 consisting of a slender line as shown in Fig. 1.

More than three cameras 3 and more than two projectors 4 are installed around said axial line 1, all of them confronting it.

In this case, the shutters of the cameras 3 are so arranged as to be opened or closed simultaneously.

The above-mentioned projectors 4 are provided with screens inside, on which many stripes or points are dispersed so that the images of these screens can be illuminated and projected on the object to be reproduced.

By employing a set of said cameras and projectors the photographing process must be carried out during the first and second steps.

In order to effect the invention, the following four steps have to be carried out in succession.

In the first step:

The electric lamps of the chamber have to be put out so that only the thin target line indicating the axis 1 can be illuminated by means of the projectors and simultaneously photographed by all of the cameras. The dry plates are left undeveloped. However, for the purpose of explanation and in order to show the result of carrying out the first step, the developed negative of a photograph taken in this step is illustrated in Fig. 2.

Numeral 1 in Fig. 2 is the thin target line indicating the photographing axis while numeral 2 represents two targets on the target line.

In the second step:

Following the completion of the first step, the target line 1 must be removed, and the object 5, for instance, a human body is caused to take the initial place of said line 1, so that the images of the screens used with the projectors can be projected onto the object by the projectors 4. In photographing the object 5, the shutters of the cameras 3 are simultaneously actuated to carry out a duplicate photographing of the object on the same dry plates as those employed in the first step. The photographic plates, after exposure as just described, are then developed.

Figure 3:
Fig. 3 is a view showing the negative obtained in the first and second steps.

Fig. 3 shows a negative obtained in the first and second steps.

Numeral 1, in Fig. 3, represents the photographing axis, 2 two targets on the target line 1, 5a a photograph of the object, and 6 a picture of the images of the screens.

In the third step:

The picture thus obtained in the second step is enlarged or contracted in the required proportions and printed in accordance with the focal distance of the lenses of the cameras, the size of a bust or statue to be sculptured and the focal distance of the lenses attached to magic lanterns which will be employed in following the fourth step.

If the size of the object 5 is assumed to be A, the size of a bust or statue to be sculptured A', and the focal length of the lenses of the camera and magic lanterns to be $f$ and $f'$ respectively, the required proportions can be determined by the following equations, reference being made to Figs. 6 and 7 it being noted that the photographing angle and the projecting angle for each projector or magic lantern are, as heretofore described of equal magnitude $\alpha°$.

$$\frac{1}{f}=\frac{1}{a}+\frac{1}{b} \tag{1}$$

$$\frac{1}{f'}=\frac{1}{a'}+\frac{1}{b'} \tag{2}$$

$$\frac{A}{A'}=\frac{a}{a'}=K \text{ (constant)} \tag{3}$$

In the fourth step:

A vertical sculpturing axis 7, corresponding to the photographing axis and consisting of a target line as employed in the first and second steps, must now be provided.

Magic lanterns 8 equal in number to the cameras employed in the first and second steps are placed around said sculpturing axis 7 in positions similar to those occupied by the respective cameras 3 around their axial line 1.

Each magic lantern is so arranged as to take the same projecting angle $\alpha°$ as the photographing angle $\alpha°$ of each corresponding camera.

Whether the position of each magic lantern 8 to the sculpturing axis 7 is substantially similar to that of each camera to the photographing axis, as mentioned above, can be judged by examining whether the image of the photographing axis 1 and the projected images of the upper and lower targets 2 on the positive photograph which is being projected by each magic lantern 8 have fallen exactly on the sculpturing axis 7, or also by examining whether the arcuate angles between neighbouring projectors for instance, the angles $\beta°$, $\beta_1°$, $\beta_2°$, etc., of Fig. 4 correspond to the respective arcuate angles between the various cameras in the photographing steps.

In order to compare the projecting angle $\alpha°$ of a magic lantern to the photographing angle $\alpha°$ of a camera, the positive photograph enlarged or contracted in the required proportions in the third step will have only to be treated in such a manner that the distance between the sculpturing axis 7 and the optical centre of the lens of a magic lantern is made equal to the distance $a'$ by employing a projector or magic lantern having, as shown in Fig. 7, a focal length $f'$.

After the projectors have been arranged as heretofore described, the sculpturing axis 7 used in positioning the projectors, is removed and clay or other plastic material is placed centrally of the projectors, in and around the position formerly occupied by the axis 7.

Then two neighbouring magic lanterns $8_1$ and $8_2$ or other two lanterns $8_1$ and $8_3$ forming a larger arcuate angle, with the axial line 7 for its vertex, may be employed so that the illuminated lines of the positive photographs obtained in the third step can be projected on the plastic material by said lanterns. The plastic material is built up or cut away to the intersecting position 10 of the projected lines or points 9 and 9' corresponding to each other among all of the lines or points which were the illuminated images of the screens on the object, thus sculpturing the whole circumference of the bust or statue.

In the case of projecting the positive pictures simultaneously through two magic lanterns, it is better to use two transparent screens, different from each other in colour, for instance, a red-coloured Cellophane is attached to one magic lantern and a blue-coloured Cellophane to the other so that the intersecting point 10 of both projecting lines can be easily found, thereby facilitating discovery of any errors on the bust or statue during the sculpturing operation.

According to the present invention, more than two upper and lower target points 2 are photographed in the first step, so that the photographs thus taken serve as preparatory means for making the position of a magic lantern to the sculpturing axis 7, employed in the fourth step, similar to that of the corresponding camera 3 to the photographing axis initially employed in the first and second steps.

By way of summation, the object 5 is photographed in the second step of the process on the dry plates on which the axial line 1 was photographed in the first step and the relative position of both is recorded. At the same time, screens used with the magic lanterns are also projected onto the object 5 so that discovery of the intersecting point 10 of the projected lines of the definite points photographed on the object is facilitated.

In third step, the photographs taken in the first and second steps are enlarged or contracted in the required proportions, which is determined on a definite basis of calculation, thus serving to equalize the photographing and projecting angles used in subsequently completing the process.

In the fourth step, the conditions or factors heretofore mentioned, are utilized to produce the sculptured object. Firstly, magic lanterns 8, equal in number to the cameras initially employed, are installed around the sculpturing axis 7 in positions similar to those in which the cameras were placed around the photographing axis 1 with the target points 2 provided thereon.

Secondly, the projecting angle (α°) through each magic lantern is made entirely equal to the photographing one (α°) in the case of the first and second steps.

Thirdly, the projection step whereby the photographically reproduced screen lines obtained in the second step are projected onto the plastic sculpturing material, permits intersecting points 10 to be easily located and with such as a guide allows the plastic material to be readily shaped to the configuration of the object to be sculptured.

Namely, according to the present invention, all the steps from first to fourth, stand in close relation to one another and reproduction of a bust or statue possessing great similarity to the object is assured by faithfully carrying out the aforesaid four steps in succession.

What is claimed is:

1. A method of reproducing objects which consists in arranging a plurality of cameras and projectors in a circle about a fixed, visible vertical line which is at the center of the circle of cameras and projectors, photographing the line on the plate of each camera, positioning a model so that its axis coincides with the position of the line, projecting onto the model a plurality of spaced vertical lines by means of the projectors, photographing the model having the spaced lines thereon on the plate of each camera, positioning plastic material so that its axis coincides with the position of the line, projecting the developed plate of each camera onto the plastic material from the position of the camera with which the plate was made, one series of alternate plates being projected with light of the same color which is different from that projecting the other series of alternate plates, and shaping the material by building up or cutting the material away until the light on the material projected through one series of alternate plates just cuts off that on the material projected through the other series of alternate plates.

2. A method of reproducing objects according to claim 1 in which the model may be made larger or smaller than the reproduced object by enlarging or contracting the photograph.

ISAO MORIOKA.